United States Patent [19]

Walley

[11] 4,311,190
[45] Jan. 19, 1982

[54] SELF CONTAINED HEATING AND COOLING SYSTEM WITH EMERGENCY HEATING

[75] Inventor: Don C. Walley, Park Ridge, Ill.

[73] Assignee: Ranco Incorporated, Columbus, Ohio

[21] Appl. No.: 36,774

[22] Filed: May 7, 1979

[51] Int. Cl.³ .............................................. F25B 29/00
[52] U.S. Cl. ........................................ 165/25; 165/28; 165/29; 62/164; 219/279
[58] Field of Search ....................... 165/25, 28, 29, 26; 62/160, 164; 219/279 X; 337/309, 312, 321, 334, 355

[56] References Cited

U.S. PATENT DOCUMENTS

| 3,318,372 | 5/1967 | Shell | 165/29 |
| 3,373,800 | 3/1968 | Ferdelman | 165/29 |
| 4,114,681 | 9/1978 | Denny | 165/26 |
| 4,228,846 | 10/1980 | Smorol | 165/29 X |

FOREIGN PATENT DOCUMENTS 1177657 9/1964 Fed. Rep. of Germany ...... 337/312

Primary Examiner—Albert W. Davis
Assistant Examiner—Margaret A. Focarino
Attorney, Agent, or Firm—Watts, Hoffmann, Fisher & Heinke Co.

[57] ABSTRACT

A self contained heating and cooling system is disclosed comprising a heat pump unit having a heat exchanger for heating and cooling air in a space, an auxiliary heating unit for heating air in the space, a support housing for the heat pump and auxiliary heating units, a cycling thermostat for governing operation of the heat pump and auxiliary heating units to enable establishment of a predetermined space air temperature, and a changeover thermostat. The changeover thermostat includes switch having first and second conditions wherein operation of the auxiliary heating means is enabled and disabled, respectively, a control switch operator for operating the control switch to its first condition in response to sensed atmospheric air temperatures below a predetermined temperature and a second control switch operator comprising a mechanism supported by the housing at a location accessible to a system user and manually actuable to effect operation of the control switch to its first condition regardless of sensed atmospheric air temperature levels.

5 Claims, 5 Drawing Figures

SELF CONTAINED HEATING AND COOLING SYSTEM WITH EMERGENCY HEATING

BACKGROUND OF THE INVENTION

The present invention relates to self-contained heating and cooling systems and more particularly to self-contained systems employing heat pump airconditioning units for accomplishing heating and cooling as well as an auxiliary heating unit.

So-called window, through the wall, and/or packaged terminal heat pump airconditioning systems are all self-contained systems in that they are constructed in a single package-like housing. These systems are generally assembled in production quantities by the manufacturer and shipped to installation sites. This enables the systems to be completely installed simply by emplacing them at an installation site and making connections to an appropriate electrical power supply. Accordingly the systems include all the necessary system operating controls, a refrigerant compressor, a refrigerant reversing valve and indoor and outdoor heat exchangers by which heat is transferred to and from the refrigerant in the system.

Typically these kinds of systems are not designed for heating by operation of the heat pump when outdoor air temperatures are near or below freezing because effective removal of the frozen moisture which accumulates on the outdoor refrigerant heat exchanger is a problem in many installations. Even in installations where removal of frozen moisture from outdoor heat exchangers is not a problem, heat pumps operate at less than maximum effectiveness when outdoor tempertures are below freezing. For these reasons many self-contained systems are provided with an auxiliary heating unit operated exclusively to heat the indoor air when outdoor air temperatures are close to and below freezing.

In order to appropriately schedule operation of the heat pump and auxiliary heating units the systems have been provided with a changeover thermostat which senses outdoor air temperature to prevent operation of the heat pump compressor and enable operation of the auxiliary heating until when sensed outdoor temperatures are below a predetermined level, e.g. 40 F.°.

By the same token the changeover thermostats prevent the auxiliary heating units from operating when outdoor air temperatures exceed the predetermined level. In the event the heat pump unit malfunctions (for example the compressor has failed in some manner), if the changeover thermostat prevents the auxiliary heating unit from being operated, the system is incapable of heating the indoor air when outside air temperatures are above the predetermined level but nevertheless cold enough that heating is required. (e.g. 45 F.°).

In order to enable the systems to operate on a temporary, emergency basis when heating is required but cannot be provided by the heat pump unit, proposals have been made for providing an emergency heat switch which functions to shunt the changeover thermostat switch and enable operation of the auxiliary heating unit. This proposed solution to the requirement for an "emergency heat" capability is costly and adds to the complexity of the systems.

SUMMARY OF THE INVENTION

The present invention provides a new and improved self-contained heat pump air conditioning system wherein a temperature responsive switch unit senses outdoor, or atmospheric, air temperatures below a predetermined level to enable operation of an auxiliary heating unit, with the temperature responsive switch unit including an override mechanism having a manually operated member for actuating the switch unit to enable operation of the auxiliary heating unit at sensed outdoor air temperatures above the predetermined temperature level.

In a preferred embodiment of the invention a self-contained heating and cooling system is provided having a heat pump unit, an auxiliary heating unit and a support housing for the units. A cycling thermostat controls operation of the heat pump unit or the auxiliary heating unit to govern the temperature of air in the space being heated or cooled by the system. A temperature responsive switching unit functioning as a changeover thermostat senses outdoor air temperature to condition a control switch for enabling operation of the auxiliary heating unit at outdoor air temperatures below a predetermined level and preventing operation of the auxiliary heating unit above the predetermined temperature. The changeover thermostat includes a control switch operator mechanism supported accessibly to a system user for actuation to effect operation of the control switch to its condition enabling operation of the auxiliary heating unit regardless of the sensed outdoor air temperature.

Self-contained heating and cooling systems constructed according to the invention are thus effective to provide for heating the indoor air by the auxiliary heating unit on an emergency basis in case the heat pump unit is ineffective when outdoor temperatures are such that auxiliary heating would otherwise be prevented. This is accomplished without requiring any additional switching assemblies, associated wiring and components.

Other features and advantages of the invention will become apparent from the following description of a preferred embodiment made with reference to the accompanying drawings.

DESCRIPTION OF A PREFERRED EMBODIMENT

Figure 1:
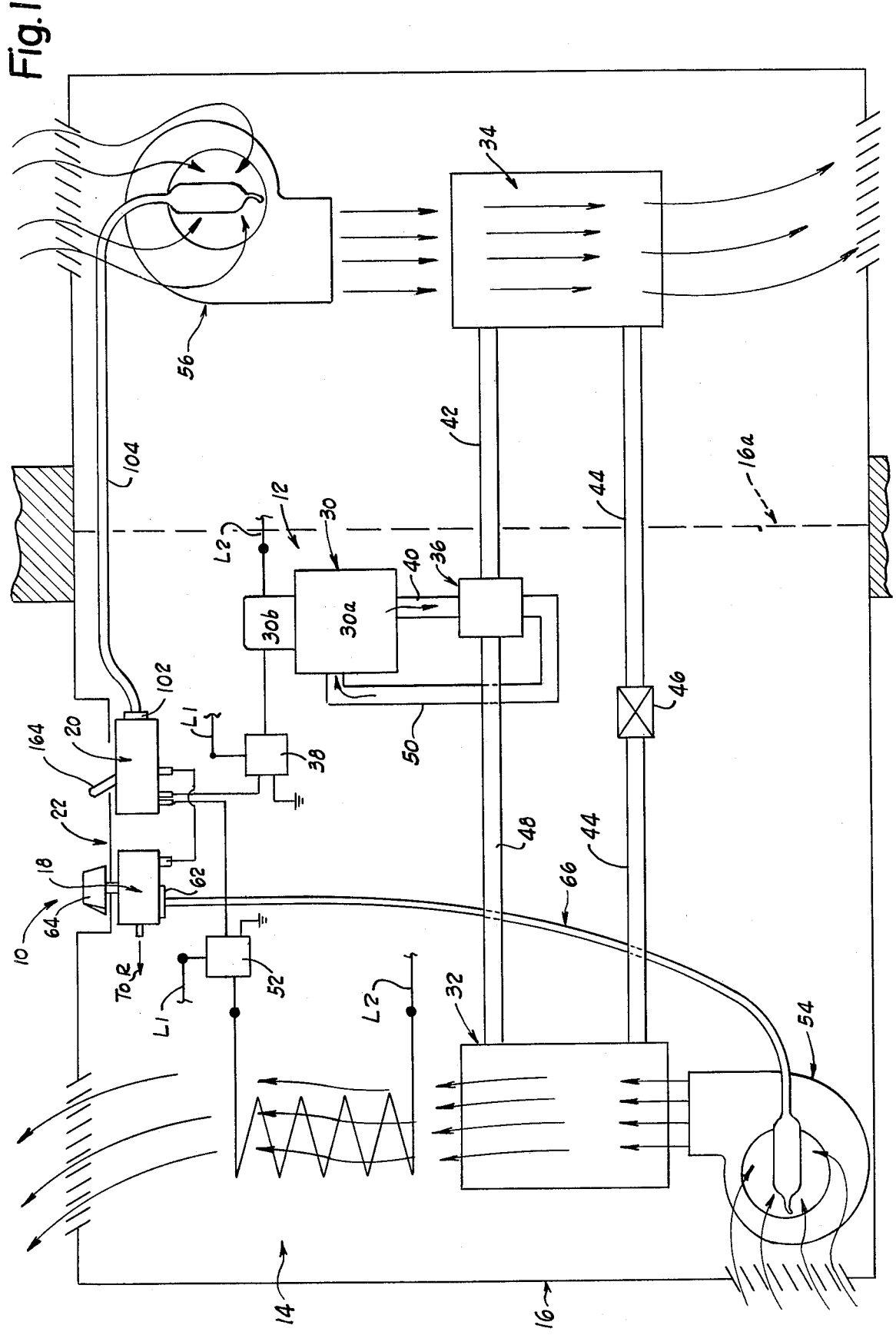
FIG. 1 is a schematic cross-sectional view of a room heating and cooling system embodying the present invention.

A self-contained room heating and cooling system 10 constructed according to the present invention is illustrated schematically by FIG. 1 of the drawings. The system 10 includes a heat pump unit, generally indicated by the reference character 12, an auxiliary heating unit 14, a system support housing 16, a room temperature responsive thermostat 18, and a temperature responsive switching unit 20, both the latter being supported adjacent an operator accessible control panel 22 situated on the housing 16. The thermostat 18 and switching unit 20 coact in controlling energization of the heat pump unit and the auxiliary heating unit when the system 10 is operated to heat the room air.

The heat pump unit 12 is a so-called condenser-evaporator type including a refrigerant compressor 30, an indoor heat exchanger 32, an outdoor heat exchanger 34 and a refrigerant flow reversing valve 36. The illustrated compressor is formed by a suitable positive displacement pump 30a which is driven by an electric motor 30b. The motor 30b is operated from a 220 volt alternating current power supply across power lines L1, L2 via a contactor assembly 38 which completes and interrupts a motor energizing circuit across the power lines.

When the heat pump unit 12 is operated to cool the indoor air, refrigerant is directed from the compressor discharge through a discharge pipe 40, the reversing valve 36, a pipe 42, the outdoor heat exchanger 34 (which functions as a refrigerant condenser) and to the indoor heat exchanger 32 via a pipe 44 and a refrigerant expansion valve 46. The indoor heat exchanger 32 functions as a refrigerant evaporator and absorbs heat from the air in the space being cooled. Refrigerant from the indoor heat exchanger returns to the compressor intake through a pipe 48, the reversing valve 36, and a compressor intake pipe 50.

When the heat pump unit 12 is operated to heat the space, the reversing valve 36 is actuated to reverse the direction of refrigerant flow so that refrigerant discharged from the compressor 38 via the pipe 40 is routed through the pipe 48 to the indoor heat exchanger 32 which, functioning as a refrigerant condenser, transfers heat from the refrigerant to the air in the space. The refrigerant then flows to the outdoor heat exchanger 34 via the pipe 44 and expansion valve 46. The outdoor heat exchanger 34 functions as the refrigerant evaporator with the refrigerant passing through it absorbing heat from the outdoor air. Refrigerant flows from the heat exchanger 34 to the compressor intake pipe 50 through the pipe 42 and the reversing valve 36. The various components of the heat pump unit can be of any conventional or suitable construction and therefore are illustrated schematically and not described here in further detail.

When outdoor air temperatures are approximately at or below freezing it is often difficult to remove frozen water from the vicinity of the outdoor heat exchanger. In many installations defrosting the outdoor heat exchanger results in the water removed from the heat exchanger refreezing in the vicinity of the exchanger and eventually building up sufficiently to block air flow across the heat exchanger and possibly creating other hazardous conditions.

Accordingly the illustrated system 10 is constructed and arranged so that when outdoor air temperatures are below a predetermined level, e.g. 40 F.°, the auxiliary heating unit 14 is operated to heat the air in the space and the heat pump unit 12 is deactivated. The auxiliary heating unit 14 can be of any suitable or conventional construction but in the illustrated and preferred embodiment of the invention the unit 14 is formed by an electric resistance heater which is connected across the power lines L1, L2 via a contactor assembly 52.

In the illustrated embodiment of the system 10 a blower 54 is supported by the housing 16 for circulating indoor air across the indoor heat exchanger 32 and the auxiliary heating unit 14 while a blower 56 is provided for directing outdoor, or atmospheric, air across the outdoor heat exchanger 34. The blowers 54, 56 are schematically illustrated and may be of any suitable or conventional construction.

The support housing 16 is illustrated schematically and includes the usual supporting framework of structural members to which the various components of the system 10 are attached as well as mounting elements for securing the system to the building in which it is installed and a sheet metal and plastic outer cabinet for covering the equipment. An insulative barrier 16a is schematically illustrated separating the outdoor heat exchanger 34 and blower 56 from the remaining components of the system. The housing 16 projects through a conforming opening in the wall of the building of which it is installed and the building wall is schematically illustrated in FIG. 1 as aligned with the insulative barrier 16a.

The room thermostat 18 can be of any suitable or conventional construction and for the purpose of description is a mechanical thermostat which enables and prevents operation of the heat pump unit 12 and the auxiliary heating unit 14 in response to sensed indoor air temperature. The thermostat 18 is illustrated schematically as having a single pole single throw switch 60 (see FIG. 3) which is actuated by a bellows type power element 62 via a suitable lever system (not illustrated). Movement of the lever system by the bellows 62 is resisted by a spring (not shown) whose force is adjustable by rotating a control knob 64 (see FIG. 1). Rotation of the knob 64 therefore sets the sensed temperature at which the switch 60 opens and closes. The bellows 62 is associated with a closed capillary tube 66 which extends to bulb section in the intake of the indoor air blower 54 so that the temperature of the indoor air returning to the intake of the blower 54 primarily governs operation of the switch 60.

The thermostat 18 has been illustrated schematically and described in relation to controlling the refrigerant compressor and auxiliary heating unit. In practice the thermostat 18 contains additional switching components which are effective to govern operation of the refrigerant reversing valve and operation of the compressor for cooling. Thermostats of this nature are known and commercially available and therefore further description of the thermostat 18 here is omitted. One such commercially available thermostat is produced by Ranco, Inc. and known as type C17.

The temperature responsive switch unit 20 functions as a changeover thermostat for controlling whether heating of the inside air is accomplished by the auxiliary heating unit 14 or the heat pump unit 12 in response to sensed outdoor air temperature as well as for enabling emergency operation of the auxiliary heating unit 14 in the event the indoor air cannot be heated by the heat pump unit 12. A preferred construction of the switching unit 20 is schematically illustrated by FIG. 2 of the drawings.

Figure 2:
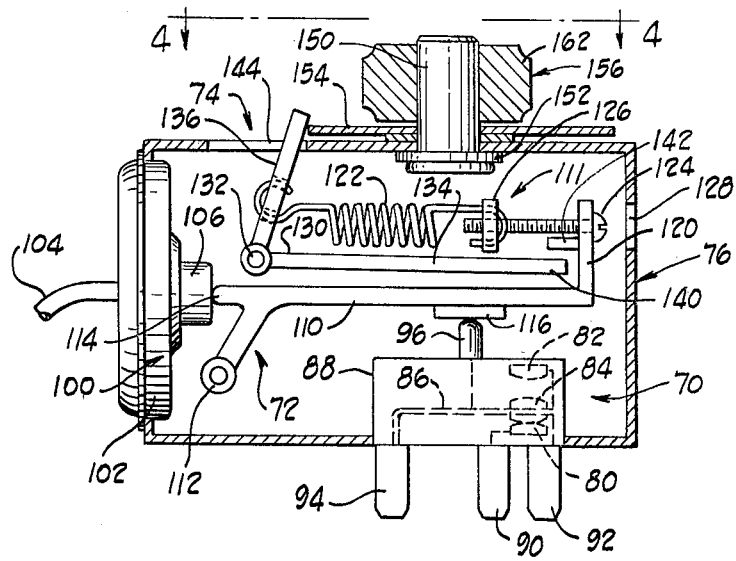
FIG. 2 is a cross-sectional view of part of the system of FIG. 1.

As shown by FIG. 2 the unit 20 comprises a control switch 70, a first control switch operator 72 and a second control switch operator 74 all supported by a sheet metal control body 76 attached to the support housing 16 adjacent the operator accessible control panel 22. The control switch 70 is schematically illustrated as a snap acting single pole double throw switch having fixed contacts 80, 82 a movable contact 84 and a snap acting electrically conductive spring blade 86 which supports the moving contact 84. The switch is supported within a molded plastic electrically insulative housing 88 from which terminals 90, 92, 94 extend for connection to the respective switch contacts 80, 82, 84. The blade 86 is operated by a motion transmitting plunger 96, preferably constructed from a plastic electrically insulative material which is movably secured to the switch housing 88.

The first control switch operator 72 is constructed to operate the control switch between its operative conditions in response to sensed outdoor air temperatures and includes a lever system 100 for engaging the control switch plunger 96 and a thermally responsive actuator for the lever system. The actuator is formed by a bellows 102 and an associated capillary tube 104 which are hermetically assembled to each other and closed after being filled with a vaporizable fluid.

Changes in temperature of the fluid filling the capillary tube 104 cause expansion or contraction of the bellows 102 in a manner which is well known. The bellows 102 is fixedly secured to the sheet metal housing 76 and the capillary tube 104 extends from the bellows through the insulative barrier 16a to bulb located at the intake of the outdoor air blower 56 so that the bellows 102 expands and contracts in response to changes in outside air temperature at the intake of the blower 56. The bellows 102 carries a rigid operating member 106 by which motion of the bellows is transmitted to the lever system 100.

The lever system 100 includes a lever member 110 and a biasing assembly 111 effective to resist movement of the lever member 110 by the bellows. The lever member 110 is movable about the axis of a pivot element 112 which extends between and is secured to the walls of the control housing 76. The member 110 includes an abutment element 114 which engages the bellows, a switch plunger engaging portion 116 engaging the plunger 96 and a projecting end section 120 remote from the pivot element 112 and the bellows. In the illustrated embodiment the switch plunger engaging portion 116 is formed by an electrically insulative pad of plastic or similar material to further insure against the possibility of electrical conduction between the plunger 96 and the lever member 110 (the latter preferably being formed from a sheet metal stamping).

The lever biasing assembly 111 is formed by a tension spring 122 connected to the lever member 110 via a force adjusting device formed by a screw 124 and nut 126 which are mounted on the projecting end section 120. The opposite end of the spring a 122 is secured in a normally fixed position with respect to the lever member 110 during normal operation of the heat pump unit. The screw 124 is rotatably supported in the projecting end section 120 of the lever member while the nut 126 is carried on the screw threads and connected to the tension spring. An access hole 128 in the control housing 76 is aligned with the head of the screw 124 so that a screw driver can be inserted through the hole to turn the screw 124 and adjust the level of spring tension acting on the lever member 110.

As outdoor air temperature increases, the bellows expands, rotating the lever body 110 clockwise (FIG. 2) about the axis of the pivot element 112. This motion tends to engage the switch contacts 80, 84. As the outside air temperature decreases the lever member 110 is urged to follow contraction of the bellows to move (counterclockwise as viewed in FIG. 2) by the spring 122 causing the switch contacts 82, 84 to engage each other. Operation of the switch contacts is determined by characteristics of the snap switch itself and the level of spring force acting on the member 110. These in turn determine the tempeature levels at which the switch unit 70 operates. Accordingly, adjustment of the screw 124 enables the control unit 20 to be set so that the operation of the control switch 70 occurs at predetermined outdoor temperature levels. In the preferred and illustrated embodiment the contacts 80, 84 are disengaged at sensed outdoor temperatures below 40 F.° to prevent operation of the heat pump unit below such that temperature level.

Figure 3:
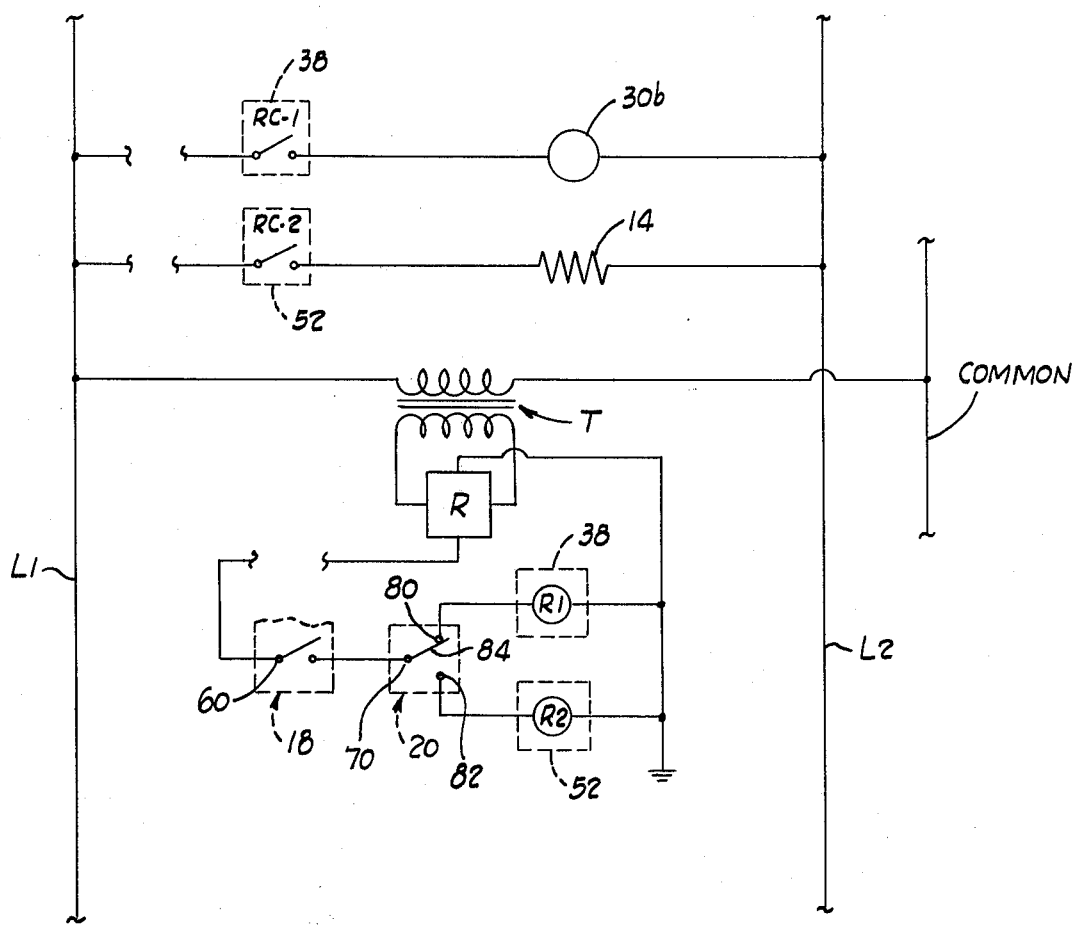
FIG. 3 is a schematic wiring diagram which partially shows the relationship between selected components of the system of FIG. 1.

FIG. 3 schematically illustrates a portion of electrical control circuitry for governing operation of the system 10 when it is conditioned to heat the indoor air. The compressor motor 30b and the auxiliary heater 14 are connected across the power lines L1, L2 via their respective contactors 38, 52. The contactors 38, 52 are schematically illustrated as having relay actuated contacts RC1, RC2, respectively, which are individually opened and closed to enable completion and interruption of energizing circuits for the compressor motor and auxiliary heater. The contacts RC1, RC2 are actuated to their closed positions by energization of relays R1, R2, respectively. The relay R1 forms part of the contactor assembly 38 while the relay R2 forms part of the contactor assembly 52. The control switch contacts 80, 82 are electrically connected to the relays R1, R2, respectively, so that the contacts 80, 84 are engaged to enable the relay R1 to be energized while engagement of the contacts 82, 84 enables energization of the relay R2.

The thermostat switch 60 is connected in series with the control switch contact 84 so that closure and opening of the thermostat switch contacts energizes and denergizes which ever of the relays R1, R2 is enabled by the control switch 20. Accordingly the indoor air is heated by the heat pump unit or by the auxiliary heating unit (depending on the condition of the control switch 70) in response to the room air temperature levels sensed by the thermostat 18.

In the illustrated circuitry the switches 60, 70 and the relays are connected across the secondary winding of a low voltage transformer T via a full wave rectifier R. The transformer primary is connected between the line L1 and a common line so that 120 VAC is supplied to the primary winding. The secondary winding steps the voltage down to 24 volts. Conventional filter elements can be used in conjunction with the low voltage control circuit if it is desirable to provide filtered direct current to the relays.

From the foregoing description it should be apparent that when sensed outdoor air temperatures exceed 40 F.° the control switch contacts 80, 84 are closed to enable the heat pump unit 12 to heat the indoor air under control of the thermostat 18. When outdoor air temperatures are below 40 F.° the control switch contacts 82, 84 are closed to enable the auxiliary heating unit 14 to heat the indoor air under control of the thermostat 18, with operation of the compressor motor 30b being prevented.

Figure 4:
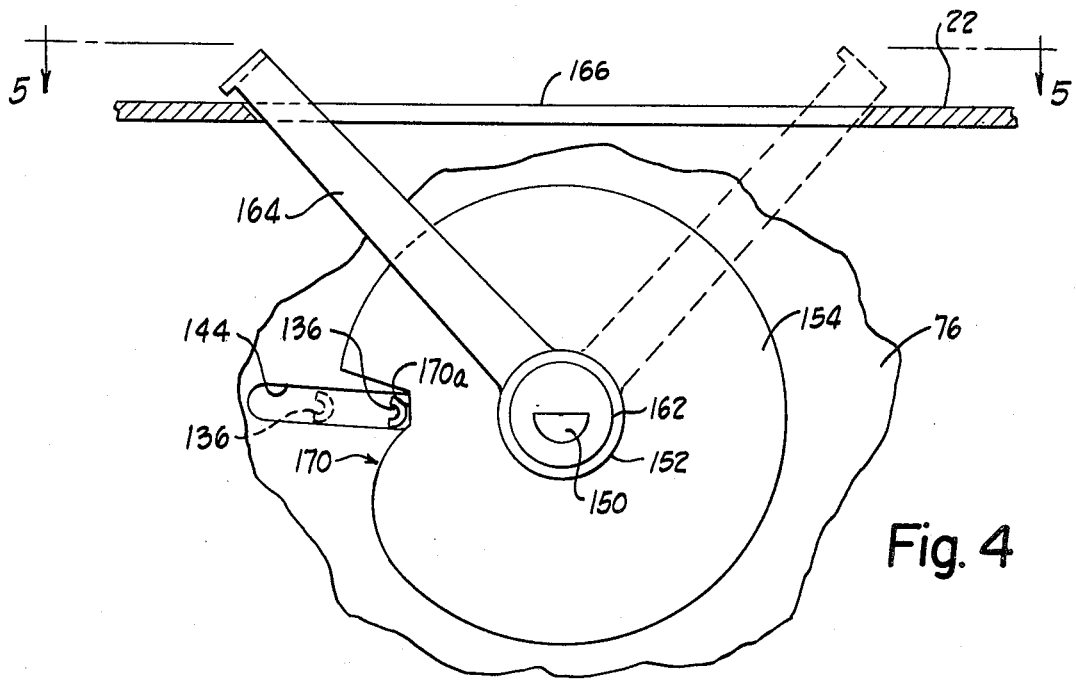
FIG. 4 is a fragmentary view seen approximately from the plane indicated by the line 4—4 of FIG. 2; and, FIG. 5 is a fragmentary elevational view seen approximately from the plane indicated by the line 5—5 of FIG. 1.

According to the present invention the temperature responsive switching unit 20 is actuable to enable the heating unit 14 to heat the indoor air under control of the thermostat 18, on an emergency heating basis, irrespective of whether the sensed outdoor air temperature is greater than 40 F.°. To this end, the second control switch operator 74 is effective to override operation of the first control switch operator 72. Hence in the event of a heat pump unit malfunction the auxiliary heating unit 14 can be operated at sensed outdoor temperatures above 40 F.°. The second control switch operator 74 includes a lever member 130 and a manual lever operator 131 (See FIGS. 2 and 4). The member 130 is pivotally movable about the axis of a pivot element 132 secured to the walls of the control housing 76 and defines first and second arms 134, 136 which project away from the pivot axis. The first lever arm 134 has an end region 140 aligned and engageable with an abutment finger 142 formed on the projecting end section 120 of the lever member 110. The second lever arm 136 extends through a guide slot 144 in the control housing 76 for engagement with the lever actuator 131.

Figure 5:
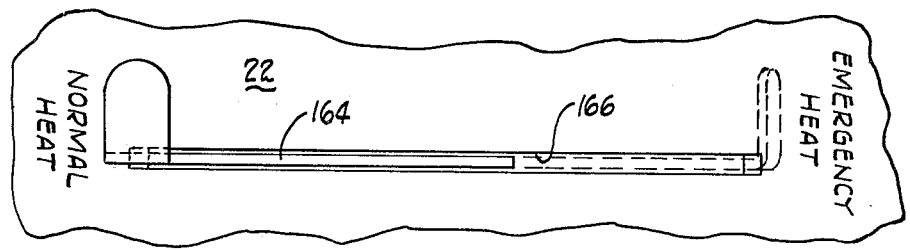

The lever actuator 131 operates the lever member 130 between a first position, in which the lever member 110 may freely actuate the control switch in response to sensed temperature, and a second position in which the lever member 110 is locked in position and ineffective to actuate the control switch 70 to close the contacts 80, 84 regardless of sensed outdoor temperature levels. The actuator 131 is normally positioned as illustrated by FIG. 2 of the drawings with the lever member 130 in its first position. Accordingly the biasing spring 122 is attached to the lever arm 136 since that arm remains stationary in the illustrated and normal operating position. The spring 122 thus maintains the lever member 130 biased to its first position. The actuator 131 includes an actuating shaft 150 rotatably secured to the control housing 76 by a journal construction schematically illustrated and indicated generally by the reference character 152, a cam 154 fixed to the shaft, and a shaft operating member 156 also fixed to the shaft. The cam 154 and shaft operating member 156 are both nonrotatably secured to the shaft, for example by the use of a "D" shaped shaft cross section and conforming openings in the cam 154 and shaft operating member 156. The preferred operating member 156 includes a shaft surrounding body 162 and an integral arm 164 extending radially from the shaft. The arm 164 (FIGS. 1, 4 and 5) projects through a slot-like opening 166 in the control panel 22. As illustrated by FIG. 5, the control panel 22 is provided with printed indicia indicating a "normal" position and an "emergency" heat position of the arm 164.

The cam 154 has a lobe 170 for engaging the end of the lever arm 136 projecting through the guide slot 144. The cam lobe section 170a provides a detent-like seat for the lever arm end under normal conditions of operation of the heat pump unit. If the heat pump unit should fail to operate and emergency heating is desired the arm 164 is moved to its "emergency heat" position (illustrated by broken lines in FIGS. 4 and 5) causing the cam lobe 170 to rotate and deflect the lever arm 136 thus pivoting the lever member 130 about the axis of the pivot element 132. The lever arm 134 engages the abutment finger 142 on the lever member 110 and forces the lever 110 against the bellows 102 away from the control switch unit 70. The control switch unit 70 therefore is actuated to engage the contacts 82 and 84 to enable energization of the auxiliary heating unit 14 regardless of the sensed outdoor air temperature. Since the bellows 102 and capillary tube 104 are filled in part by vaporized fluid the bellows can be compressed by the lever system without damage.

In the "emergency heat" mode of operation the indoor air is heated by the auxiliary heating unit 14 and cycled by the thermostat 18 to maintain the indoor air temperature at desired temperature levels. Moreover, since the relay R1 is prevented from being energized operating current is not supplied to the compressor motor 30b thus avoiding possible additional damage to the heat pump unit. When the heat pump unit malfunction is corrected the lever 164 is moved back to its "normal heat" position so that the indoor air can again be heated by the heat pump unit or the auxiliary heating unit depending on the sensed outdoor air temperature.

While a single embodiment of the present invention is illustrated and described herein in considerable detail the invention is not to be considered limited to the precise construction disclosed. Various adaptations, modifications and uses of the invention may occur to those skilled in the art to which the invention relates and the intention is to cover all such adaptations, modifications and uses which fall within the spirit or scope of the appended claims.

What is claimed is:

1. A self-contained heating and cooling system for a space comprising:
   (a) a heat pump unit having a heat exchanger for heating and cooling air in the space;
   (b) auxiliary heating means for heating air in the space;
   (c) a support housing for said heat pump unit and said auxiliary heating means;
   (d) a cycling thermostat for governing operation of said heat pump unit and said auxiliary heating means to enable establishment of a predetermined air temperature in the space; and,
   (e) changeover thermostat means comprising a control switch having a first condition wherein operation of said auxiliary heating means is enabled, and a second condition for disabling said auxiliary heating means, a first control switch operator means for operating said control switch to said first condition in response to sensed atmospheric air temperature below a predetermined temperature, and a second control switch operator means comprising a mechanism supported by said housing at a location accessible to a user of the system, said mechanism supported for actuation to effect operation of said control switch to said first condition regardless of atmospheric air temperature levels sensed by said first control switch operator means;
   (f) said first control switch operator means comprising an expansible chamber actuator, a capillary tube extending from said actuator to a location exposed to atmospheric air, an expansible and contractible fluid filling said actuator chamber and capillary tube and, a lever reacting between said expansible chamber actuator and said control switch and supported for pivotal motion to actuate said control switch in response to expansion and contraction of said expansible chamber actuator.

2. The unit claimed in claim 1 wherein said second control switch operator mechanism comprises a second lever pivotally supported for movement relative to said first lever and movable to move said first lever to operate said control switch to said first condition independently of said expansible chamber actuator.

3. The system claimed in claim 2 wherein said second control switch operator mechanism further comprises a manually movable member and a cam, said cam engaging and pivotally moving said second lever in response to manual movement of said manually movable member.

4. The system claimed in claim 1 wherein said second control switch operator mechanism further comprises a manually movable member, a cam movable in response to movement of said manually movable member and a motion transmitting member for reacting between said cam and said lever for moving said lever independently of said expansible chamber actuator.

5. The system claimed in claim 1 wherein said control switch is a single pole double throw switch operable to said first condition by said actuator and independently operable to said first condition by said mechanism.

* * * * *